April 9, 1940.  H. L. FORGAARD  2,196,450
HOUSEHOLD ARTICLE
Filed March 23, 1938
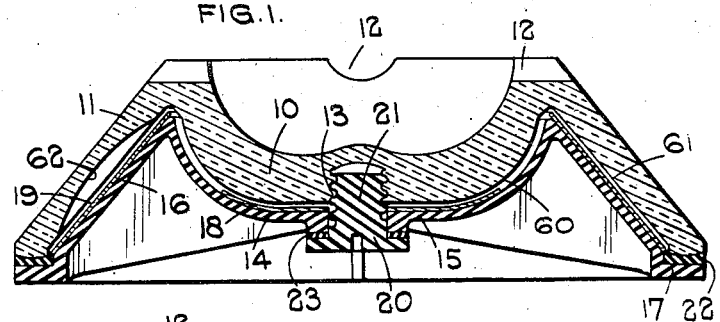
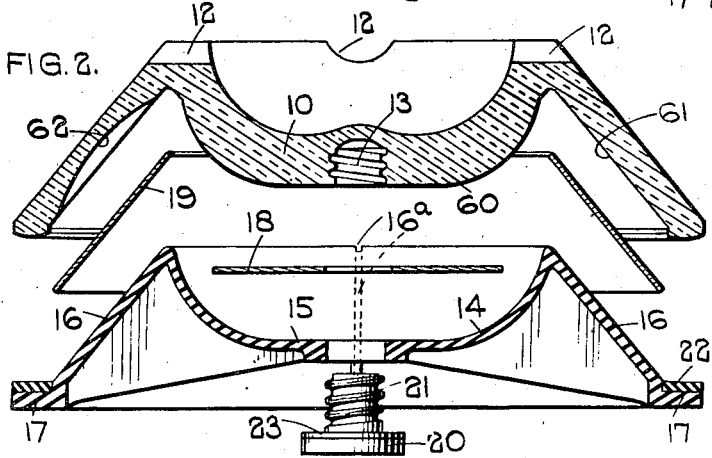
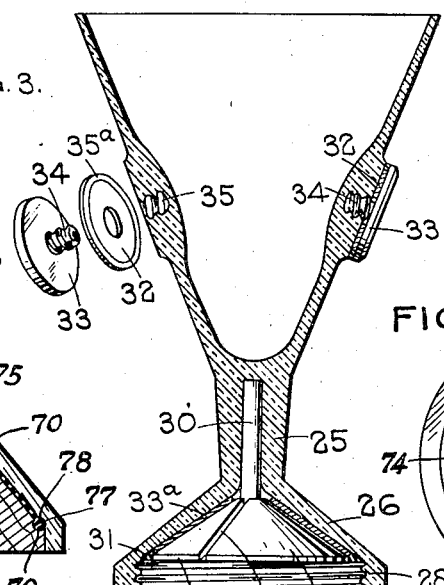
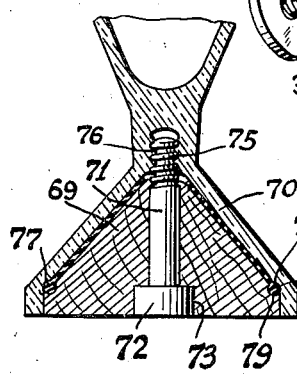
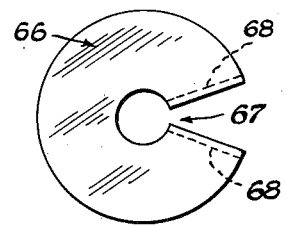
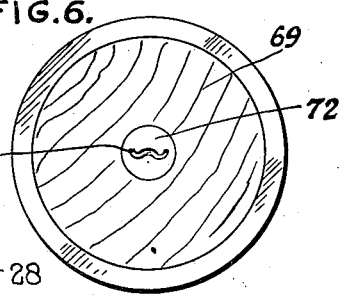
Harcourt Lester Forgaard
Inventor
Taulmin & Taulmin
Attorneys.

Patented Apr. 9, 1940

2,196,450

UNITED STATES PATENT OFFICE 2,196,450

HOUSEHOLD ARTICLE

Harcourt Lester Forgaard, Birmingham, England

Application March 23, 1938, Serial No. 197,743
In Great Britain March 30, 1937

9 Claims. (Cl. 40—10)

This invention relates to articles formed as vessels or containers, and is primarily intended for application to table articles, the object of the invention being to provide an improved construction.

The invention is applicable to a large range of articles such, for instance, as ashtrays, drinking vessels or jugs, plates and dishes, jars and containers for foodstuffs, glass or ceramic ware used in laboratories, kitchen equipment, and milk or other bottles.

The objects of the present invention are as follows:

(1) To construct the appliance so that the advertisement or decorative matter is easily and quickly inserted and removed.

(2) To construct the appliance so that the advertisement or decorative matter is securely held in place by screwed pressure.

(3) To construct the appliance so that the advertisement or decorative matter is fully protected against liquid or moisture such as atmospheric condensation. In this connection it will be realised that the effect of atmospheric condensation or liquid which may, for instance, be used in washing the appliance, will be to soil the advertisement or decorative matter so that it becomes unsightly.

(4) To construct the appliance so that a maximum proportion of the surface of the article is made available for the advertisement or decorative matter.

(5) To construct the appliance so that the advertisement or decorative matter will appear to its best advantage having regard to the shape and form of space available.

(6) To construct the appliance so that a large variety of advertisements and decorative designs can be used and at a relatively negligible cost.

(7) To construct the appliance so that the advertisement or decorative matter can be viewed through clear transparent parts of the article without distortion, enabling, amongst other effects, that of coloured glass to be obtained.

(8) To construct the appliance so that the device holding the advertisement or decorative matter in position is not visible to the eye when the article is in its normal position, or is otherwise not unsightly.

(9) To construct the appliance so that the advertisement or decorative matter can be securely locked in position.

(10) To construct the appliance so that the advertisement or decorative matter can be left in position for a considerable time without deterioration in any way.

(11) To construct the appliance so that the advertisement space can be let equally well for long or short periods of time.

Referring to the drawing:

Figure 1 is a sectional view in side elevation showing one method of applying the invention to an ashtray.

Figure 2 is a sectional view showing the parts separated.

Figure 3 is a sectional view in side elevation showing the invention applied to a drinking vessel.

Figure 4 is a plan view showing a sheet of material suitable for bearing a label or an advertisement or decorative matter.

Figure 5 is a sectional view showing the base of a vessel or container to which a detachable member has been applied for forming or holding an advertisement in place.

Figure 6 is an under side plan view of the construction shown in Figure 5.

In the construction shown in Figures 1 and 2, the article, which constitutes an ashtray, is made of glass or other transparent material and has a central part 10 of cup-like form, and a peripheral part 11 which is of conical form. At the junction of these two parts, the usual grooves 12 are provided for supporting cigarettes, cigars or the like.

At the centre of the under side of the part 10 is provided a screw threaded recess 13.

The detachable member may be made of synthetic resin or any other suitable material, and as shown is made in two parts. The part 14 is shaped approximately to correspond with the under side of the ashtray, and comprises a centre portion 15 of cup-like form, an outer part 16 of conical form, and a base flange 17.

The parts 15 and 16 are adapted to retain in position sheets 18 and 19 of paper, thin metal or any other suitable material upon which any suitable matter may be printed, this matter being visible through the material of the ashtray.

The part 16 may be provided with one or more radial slots such as 16ª, into which the ends of the paper may be placed, so that it will be retained in position upon this member.

In the construction shown in Figure 4, a circular sheet 66 is shown having a radial cut or gap 67 and marked with dotted lines 68 to show where it is to be folded. This sheet can be printed with advertising or with decorative matter, and it can be folded to form a cone, the folded-down portions adjacent the lines 68 fitting into a slot or into separate slots provided in the detachable member.

Alternatively, advertising or other matter may be printed or moulded directly upon the upper surfaces of the parts 15 and 16 in Figures 1 and 2, and the under side of the ashtray at 60 or 61 may additionally have embossed lettering or signs moulded on, and concave surfaces 62 may be provided to suit and magnify lettering and signs on the plug or sheets 18 and 19 if desired.

At the centre the part 15 is provided with an opening through which extends a screwed plug 20, this plug including a screwed spigot 21 which engages in the threaded recess 13. The plug 20 can of course be turned on its own centre without turning the member 14, so that the advertising or other matter carried by the member 14 is not turned round relatively to the ashtray as it is secured in position.

Compressible washers are provided at 22 between the flange 17 and the base of the ashtray, and at 23 between the head of the plug 20 and the adjacent surface of the member 14.

Instead of clamping printed or advertising matter between the detachable member and the ashtray, matter of a decorative nature may be provided.

The under surface of the flange 17 may be formed or provided with soft material so that it will serve as a protective element, and rubber may be used for this purpose.

In the construction shown in Figure 3, the invention is shown applied to a drinking glass, the stem 25 of which is hollow, and in this case the base flange 26 is recessed at its under side and receives the detachable member 27, which may be made of synthetic resin or any other suitable material.

The base of the glass is screw threaded at 28, and the detachable member 27 is provided with a screw thread at its periphery. The member 27 also has a stem 30 which is adapted to enter the hollow stem 25.

The detachable member 27 is shaped to correspond substantially with the shape of the under surface of the recess in the bottom of the glass, and a compressible washer 31 is placed in a groove 32ª formed at the periphery of the detachable member. A sheet 33ª bearing advertising or labelling or decorative matter may be clamped between the detachable member 27 and the under surface of the recess in the base 26 of the glass, and this sheet may consist of a part ring having a radial cut, and the edges adjacent the radial cut may be folded down to engage in a radial slit 87 in the member 27.

The stem 30 may bear advertising or decorative matter which is visible through the glass stem 25.

Further decorative members, or members carrying advertising matter, are shown at 32, these being held in place by detachable members 33, each having a screwed spigot 34 engaging in a threaded recess 35 in the side of the bowl of the glass, and for the purpose of protecting the member 32, a compressible washer 35ª may be placed around it so as to be clamped against the side of the glass by the detachable member 33.

Further, any of the features disclosed in any of the constructions described may be applied where appropriate to any of the other constructions. For instance, the construction of the detachable member in two parts, one of which is screw threaded and can rotate, may be applied to the construction shown in Figure 3.

Further, when the detachable member is applied to the base, it may be made of, or faced with, a material having heat insulating qualities or a material which is relatively soft and compressible, so as to provide either for heat insulation or for other protective purposes.

In all cases where a sheet bearing decorative or advertising or similar matter is used, it is protected from contact with water which may be used for washing the article, or other water or liquid which may be present.

In any of the constructions, means may be provided to prevent the unauthorized removal of the detachable member, or sealing means may be provided to enable such removal to be detected. The detachable member may be so formed that a key or tool of some special form is required to screw it into position and to remove it.

One such construction is shown in Figures 5 and 6, where the detachable member 69 is shaped to fit a recess in the base 70 of a vessel or container, and is held in position by a screw 71 having a head 72 which enters a shouldered recess 73 in the end of the detachable member 69. The arrangement is such that when the screw is screwed into position, the head 72 is entirely countersunk and cannot be gripped by the hand or even by a tool. This screw can only be removed by a special tool adapted to fit the slot shown at 74.

The screw proper is shown at 75 and engages in a thread 76 formed in the vessel.

A compressible ring 77 (Figure 5) is shown engaging partly in a groove 78 shown in the base of the vessel and partly in the groove 79 shown in the detachable member.

What I claim then is:

1. A vessel comprising a body having a hollow top forming a container, and a depending flange forming a support, the underside of the top and flange together forming a pocket, said pocket having a screw threaded recess, a detachable member shaped to fit the internal surface of said pocket, said detachable member having an opening registering with said recess, a screw projecting through said opening and screwing into said recess, said screw having a flanged head, a sheet bearing display matter clamped between said detachable member and said body, and compressible packing rings between said flanged head and the detachable member, and between the detachable member and the depending flange of the body.

2. A vessel comprising a body having a hollow top forming a container, and a depending flange forming a support, the underside of the top and flange together forming a pocket, said pocket having a screw threaded recess, a detachable member shaped to fit the internal surface of said pocket, said detachable member having an opening registering with said recess, a screw projecting through said opening and screwing into said recess, said screw having a flanged head, a sheet bearing display matter clamped between said detachable member and the under surface of said depending flange, and compressible packing rings between said flanged head and the detachable member and between the detachable member and the depending flange of the body.

3. A vessel comprising a body having a hollow top forming a container, and a depending flange forming a support, said flange having sides which diverge in the downward direction, the underside of the top and flange together forming a pocket, the interior of said pocket being screw threaded, a detachable member shaped to fit the internal surface of said pocket, said detachable member having a shoulder at its periphery, a screw threaded part associated with said detachable member engaging the screw thread in the pocket, a sheet bearing display matter clamped between said detachable member and said body and being visible through the thickness of said flange, and a compressible packing ring disposed between the shoulder on the detachable member and the adjacent part of the inner surface of said flange.

4. A vessel comprising a body having a hollow top forming a container, and a depending flange forming a support, said flange having sides which diverge in the downward direction, the underside of the flange forming a pocket, said pocket having a recess, and the interior of said pocket being screw threaded, a detachable member shaped to fit the internal surface of said pocket, means associated with said detachable member engaging in said recess, said detachable member having a slot extending across its surface, an advertising or like sheet of gapped ring form mounted on said detachable member and having the edges adjacent the gap folded into said slot, and a screw threaded part associated with said detachable member engaging the screw thread in the pocket.

5. A vessel comprising a body having a hollow top forming a container, and a depending flange forming a support, said flange having sides which diverge in the downward direction, the underside of the flange forming a pocket, the interior of said pocket being screw threaded, a detachable member shaped to fit the internal surface of said pocket, said detachable member having a slot extending across its surface, an advertising or like sheet of gapped ring form mounted on said detachable member and having the edges adjacent the gap folded into said slot, and a screw threaded part associated with said detachable member engaging the screw thread in the pocket.

6. A vessel comprising a body having a hollow top forming a container and a depending conical flange forming a downwardly directed pocket, said flange having sides which diverge in the downward direction, the interior of said pocket being screw threaded, a detachable member shaped to fit the internal surface of said pocket, said detachable member having a shoulder at its periphery, a screw threaded part associated with said detachable member engaging the screw thread in the pocket, a sheet bearing display matter clamped between said detachable member and said body and being visible through the thickness of said flange, and a compressible packing ring disposed between the shoulder on the detachable member and the adjacent part of the inner surface of said flange.

7. A vessel comprising a body having a hollow top forming a container and a depending conical flange forming a downwardly directed pocket, the interior of said pocket being screw threaded, a detachable member shaped to fit the internal surface of said pocket, said detachable member having a slot extending across its surface, an advertising or like sheet of gapped ring form mounted on said detachable member and having the edges adjacent the gap folded into said slot and a screw threaded part associated with said detachable member engaging the screw thread in the pocket.

8. A vessel comprising a body having a hollow top forming a container and a conical flange extending downwardly from the edge of said hollow top, the underside of the top and flange together forming a pocket, said pocket having a screw threaded recess, a detachable member shaped to fit the internal surface of said pocket, said detachable member having a slot extending across its surface, said detachable member having an opening registering with said recess, a screw projecting through said opening and screwing into said recess, said screw having a flanged head and an advertising or like sheet of gapped ring form mounted on said detachable member and having the edges adjacent the gap folded into said slot.

9. A vessel comprising a body having a hollow top forming a container, and a depending flange forming a support, said flange having sides which diverge in the downward direction, the underside of the top and flange together forming a pocket, the interior of said pocket being screw threaded, a detachable member shaped to fit the internal surface of said pocket, said detachable member having a flange at its periphery engaging under the lower edge of said depending flange, a screw threaded part associated with said detachable member engaging the screw thread in the pocket, and a sheet bearing display matter clamped between said detachable member and said body and being visible through the thickness of said flange.

HARCOURT LESTER FORGAARD.